United States Patent
Adams et al.

(10) Patent No.: US 9,396,007 B2
(45) Date of Patent: Jul. 19, 2016

(54) CACHE MANAGEMENT IN A MULTI-THREADED ENVIRONMENT

(71) Applicant: Facebook, Inc., Menlo Park, CA (US)

(72) Inventors: Keith Adams, San Carlos, CA (US); Jason Owen Evans, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 589 days.

(21) Appl. No.: 13/849,148

(22) Filed: Mar. 22, 2013

(65) Prior Publication Data

US 2014/0289734 A1    Sep. 25, 2014

(51) Int. Cl.
| | | |
|---|---|---|
| G06F 9/46 | (2006.01) | |
| G06F 9/455 | (2006.01) | |
| G06F 9/50 | (2006.01) | |
| G06F 9/48 | (2006.01) | |
| G06F 12/08 | (2016.01) | |

(52) U.S. Cl.
CPC .......... *G06F 9/45516* (2013.01); *G06F 9/4881* (2013.01); *G06F 9/5038* (2013.01); *G06F 12/0875* (2013.01); *G06F 2212/452* (2013.01)

(58) Field of Classification Search
CPC .............. G06F 2009/503; G06F 2009/506; G06F 2009/45562; G06F 11/0712; G06F 11/1433; G06F 11/3055
See application file for complete search history.

(56) References Cited

U.S. PATENT DOCUMENTS

| | | | | |
|---|---|---|---|---|
| 6,662,252 B1* | 12/2003 | Marshall | ................... | G06F 9/52 710/200 |
| 8,135,839 B1* | 3/2012 | Wormley | ................... | G06F 9/52 709/203 |
| 8,611,542 B1* | 12/2013 | Ishii et al. | ................... | 380/277 |
| 8,832,705 B1* | 9/2014 | Berde | ................... | G06F 9/526 709/226 |
| 2003/0100957 A1* | 5/2003 | Chaffee et al. | ................... | 700/18 |
| 2003/0145035 A1* | 7/2003 | de Bonet | ................... | G06F 9/526 718/102 |
| 2006/0136914 A1 | 6/2006 | Marascio et al. | ............. | 718/100 |
| 2007/0233969 A1* | 10/2007 | Shukla | ................... | G06F 9/4881 711/150 |
| 2007/0283357 A1* | 12/2007 | Jeter | ................... | G06F 9/5027 718/102 |
| 2009/0172689 A1* | 7/2009 | Bobak et al. | ................... | 718/104 |
| 2010/0023521 A1* | 1/2010 | Arcese et al. | ................... | 707/8 |
| 2010/0122253 A1* | 5/2010 | McCart | ................... | G06F 8/458 718/100 |
| 2010/0217868 A1* | 8/2010 | Heller, Jr. | ............. | G06F 9/5011 709/226 |

* cited by examiner

*Primary Examiner* — Lewis A Bullock, Jr.
*Assistant Examiner* — Tina Huynh
(74) *Attorney, Agent, or Firm* — Perkins Coie LLP

(57) ABSTRACT

Disclosed here are methods, systems, paradigms and structures for deleting shared resources from a cache in a multi-threaded system. The shared resources can be used by a plurality of requests belonging to multiple threads executing in the system. When requests, such as requests for executing script code, and work items, such as work items for deleting a shared resource, are created, a global sequence number is assigned to each of them. The sequence number indicates the order in which the requests and work items are created. A particular work item can be executed to delete the shared resource if there are no requests having a sequence number lesser than that of the particular work item executing in the system. However, if there is at least one request with a sequence number lesser than that of the particular work item executing, the work item is ignored until the request completes executing.

18 Claims, 11 Drawing Sheets

CACHE MANAGEMENT IN A MULTI-THREADED ENVIRONMENT

FIELD

This disclosure relates to cache management and more specifically to managing a shared resource in the cache of a multi-threaded system.

BACKGROUND

Scripting languages offer simplicity and ease of development to software developers. Script code is easy to write since scripting languages are often based on a small set of expressions and statements that are simple to learn. Software developers often use scripting languages for rapid development of applications, for example, web applications. Scripting languages may be used for server side programs or for client side programs. Examples of server side scripting languages include PHP (Personal Home Page) and examples of client side scripting languages include JAVASCRIPT.

Server side script code can be used for executing a user request received at a web server by dynamically generating web pages. Server side scripting is often used for implementation of interactive websites that interface with data stores for retrieving and storing information. The PHP scripting language allows embedding of script code with hypertext markup language (HTML). Client side script code is often used for performing simple computations on the client side rather than sending a request to the server for simple computations.

A script code can be executed by generating machine code for the script code. In multi-threaded systems, there can be multiple threads accessing the machine code from, for example, an instruction cache. As script code is modified, it is possible for portions of data in the instruction cache to become invalid since a new version of the machine code is now made available in place of the older version. But, the invalid data may not be deleted immediately upon recognizing that they are invalid since there can be other threads that maybe actively using data that are in effect invalid. Current multi-threaded systems typically lack an effective way to determine a time when the invalid data that may be accessed by one or more threads can be deleted.

SUMMARY

Introduced here are methods, systems, paradigms and structures for managing a cache having resources that are shared by a number of requests executing in a multi-threaded system. One example of a request can include requests for executing a script code, which can be created by a plurality of threads executing in the system. An example of a shared resource can include executable code generated for the script code, data associated with the executable code such as metadata, etc. When the script code is modified, a new version of the executable code is generated and loaded into the cache for execution. However, the older version of the executable code cannot be deleted from the cache until all the requests that were executing before the newer version of the executable code is loaded into the cache have completed executing. The requests that had begun executing before the newer version of the executable code is loaded may still be accessing the older version of the executable code.

One possible method of deleting such shared resources can include associating each of the requests with a global sequence number and using the global sequence number for determining when it is safe to delete the shared resources. Whenever requests for executing the script code or work items for deleting a shared resource (work items can be objects created by requests) are created, a sequence number is assigned to each of them. The sequence number indicates the order in which the requests or work items are created. For example, if requests RA, RB, RC and work items WX and WY are created in a sequence such as RA, WX, RB, RC and WY, then the sequence numbers, for example, 1-5 can be assigned to each of the requests and/or work items which generates the sequence as 1RA, 2WX, 3RB, 4RC and 5WY.

When the work items are created, they may be added to a work item queue. The work item queue may be monitored regularly to determine if any of the work items can be executed to the delete the shared resource identified by the work item. In one embodiment, the work item queue is monitored when a new request is created in the system. For each of the work items in the queue, the new request determines whether there is any request executing in the system, which has a sequence number lesser than that of the work item. If there is no request having a sequence number lesser than that of the work item, the new request executes the work item to delete the shared resource. However, if the new request determines that there is at least one request with a sequence number lesser than that of the work item executing, then it ignores the work item.

Requests can originate from a plurality of threads in the system executing the script code. The request creates a work item when it identifies that a particular shared resource is obsolete and the shared resource should be deleted. However, since there may be other requests that may be using the identified shared resource, the request that created the work item cannot delete the shared resource.

The sequence numbers described above is one example of generating a sequence to identify the requests that are older than a particular work item. However, in other embodiments, the sequence numbers may be generated based on various other logic to identify requests that are created prior to creation of a particular work item and still executing.

Some embodiments of the disclosed technique have other aspects, elements, features, and steps in addition to or in place of what is described above. These potential additions and replacements are described throughout the rest of the specification.

DETAILED DESCRIPTION

Figure 1:
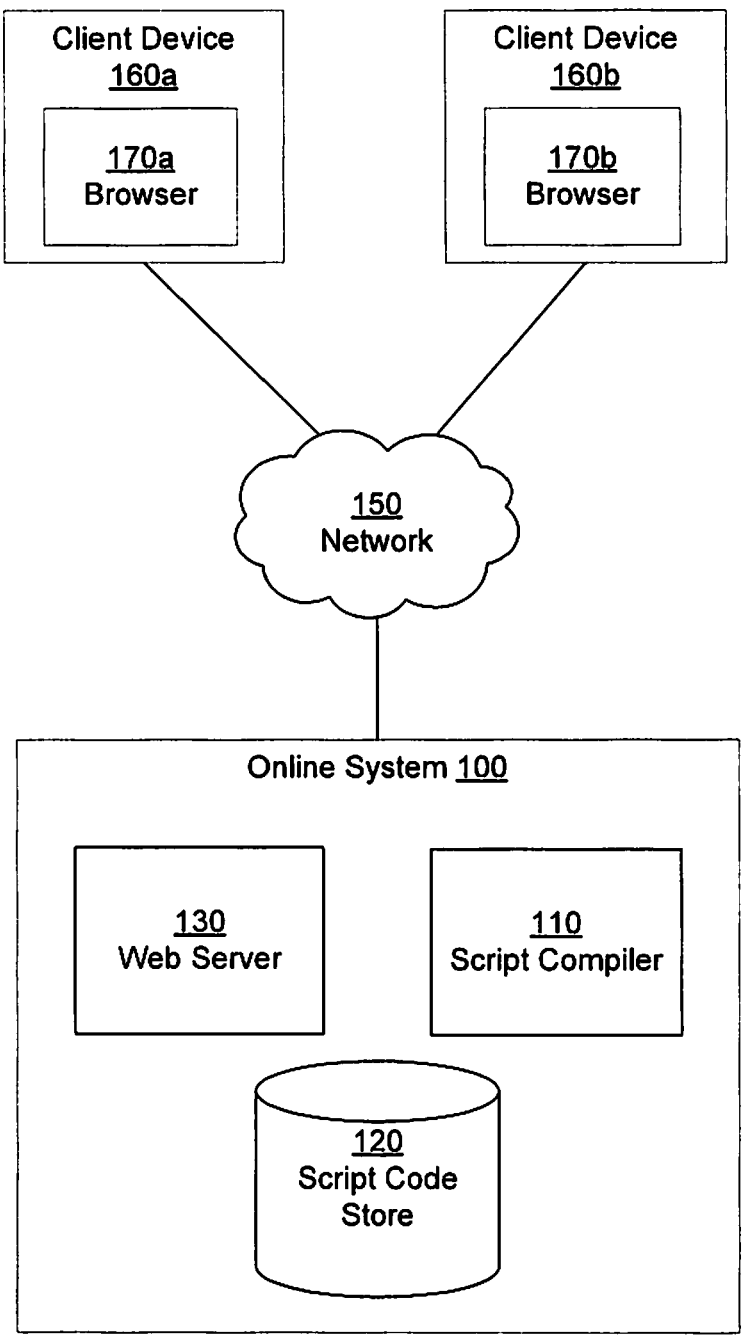
FIG. 1 is an environment in which an embodiment of the disclosed technique may operate.

References in this description to "an embodiment", "one embodiment", or the like, mean that the particular feature, function, or characteristic being described is included in at least one embodiment of the present disclosure. Occurrences of such phrases in this specification do not necessarily all refer to the same embodiment, nor are they necessarily mutually exclusive.

Disclosed here are methods, systems, paradigms and structures for managing a cache having resources that are shared by a number of requests executing in a multi-threaded system. One example of a request can include requests for executing a script code, which can be created by a plurality of threads executing in the system. An example of a shared resource can include executable code generated for the script code, data associated with the executable code such as metadata, etc. When the script code is modified, a new version of the executable code is generated and loaded into the cache for execution. However, the older version of the executable code cannot be deleted from the cache until all the requests that were executing before the newer version of the executable code is loaded into the cache have completed executing. The requests that had begun executing before the newer version of the executable code is loaded may still be accessing the older version of the executable code.

One possible method of deleting such shared resources can include associating each of the requests with a global sequence number and using the global sequence number for determining when it is safe to delete the shared resources. Whenever requests for executing the script code or work items for deleting a shared resource (work items can be objects created by requests) are created, a sequence number is assigned to each of them. The sequence number indicates the order in which the requests or work items are created. For example, if requests RA, RB, RC and work items WX and WY are created in a sequence such as RA, WX, RB, RC and WY, then the sequence numbers, for example, 1-5 can be assigned to each of the requests and/or work items which generates the sequence as 1RA, 2WX, 3RB, 4RC and 5WY.

When the work items are created, they may be added to a work item queue. The work item queue may be monitored regularly to determine if any of the work items can be executed to the delete the shared resource identified by the work item. In one embodiment, the work item queue is monitored when a new request is created in the system. For each of the work items in the queue, the new request determines whether there is any request executing in the system, which has a sequence number lesser than that of the work item. If there is no request having a sequence number lesser than that of the work item, the new request executes the work item to delete the shared resource. However, if the new request determines that there is at least one request with a sequence number lesser than that of the work item executing, then it ignores the work item.

Requests can originate from a plurality of threads in the system executing the script code. The request creates a work item when it identifies that a particular shared resource is obsolete and the shared resource should be deleted. However, since there may be other requests that may be using the identified shared resource, the request that created the work item cannot delete the shared resource.

The sequence numbers described above is one example of generating a sequence to identify the requests that are older than a particular work item. However, in other embodiments, the sequence numbers may be generated based on various other logic to identify requests that are created prior to creation of a particular work item and still executing.

The script code can be written in various programming languages, including PHP (Personal Home Page), and programming languages that provide support for either a single-threaded execution or multi-threaded execution. The embodiments of the disclosed technique are described with reference to FIGS. 6-10. Further, the above described embodiments may be performed in various environments, including the environments described in association with FIGS. 1-5. For example, the executable code of the script code executed by the requests in FIGS. 6-10 can be generated using environments described with reference to FIGS. 1-5.

FIG. 1 shows a system environment for allowing a client device to interact with an online system that generates dynamic web pages by compiling script code, in accordance with an embodiment of the disclosed technique. FIG. 1 illustrates client devices 160 interacting with an online system 100 using the network 150. The client devices 160 send requests to the online system 100 via the network 150. The online system 100 may dynamically generate web pages in response to the request and send the generated web pages to the client device 160 in response to the request.

FIG. 1 and the other figures use like reference numerals to identify like elements. A letter after a reference numeral, such as "160*a*," indicates that the text refers specifically to the element having that particular reference numeral. A reference numeral in the text without a following letter, such as "160," refers to any or all of the elements in the figures bearing that reference numeral (e.g. "160" in the text refers to reference numerals "160*a*" and/or "160*b*" in the figures).

Embodiments of the computing environment can have multiple client devices 160 and multiple online systems 100 connected to the network 150. Certain functionality described in one embodiment as being performed on the server side can also be performed on the client side in other embodiments if appropriate. For example, although FIG. 1 shows the script compiler 110 running on the online system 100 for compiling server side script code, in other embodiments, the script compiler 110 may run on the client device 160 for compiling client side script code. In addition, the functionality attributed to a particular component can be performed by different or multiple components operating together.

The client devices 160 include one or more computing devices that can receive user input and can transmit and receive data via the network 150. The client device 160 can execute an application, for example, a browser application 170 that allows a user of the client device 160 to interact with the online system 100. A user may provide input using a user interface presented to the user via the browser application 170. The interactions of the user via the browser application 170 may cause the browser application 170 to send a request for information that identifies a markup language document including server side scripting code. The markup language document is processed to obtain a transformed markup language document that is returned in response to the request.

The network 150 uses standard communications technologies and/or protocols. Thus, the network 150 can include links using technologies such as Ethernet, 802.11, worldwide interoperability for microwave access (WiMAX), 3G, digital subscriber line (DSL), etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

The online system 100 comprises a web server 130, a script compiler 110 and a script code store 120. The web server 130 is a module processing requests received by the online system 100 from client devices 160 or other external systems that interact with the online system 100. The web server 110 may be implemented by conventional web server software, such as APACHE or INTERNET INFORMATION SERVICES. In response to a request from a client device 160, the web server 130 may invoke other modules of the online system 100 to process the request. For example, the web server 130 may invoke modules of the online system 100 to obtain a web page in response to the request from the client device 160. The web server 130 sends the web page to the client device 160 for presentation on the browser 170.

The script code store 120 stores script code that implements portions of functionality provided by the online system 100 to client devices 160. A script code may include a function, procedure, method, or a block of code that may be embedded within an HTML document. The script code implements functionality, for example, retrieving information stored in various databases of the online system 100, performing computations, or interacting with other systems.

The script compiler 110 takes script code in source code form and generates equivalent executable code for execution by a processor of the online system 100 (in this disclosure, the term "script code" is also referred to as "script.") In an embodiment, the script compiler 110 performs incremental compilation of the script code in a lazy fashion. For example, a portion of script code is compiled if a request causes this portion of script code to execute. Once a portion of the script code is compiled, the generated executable code is available for future requests. However, if no request received by the online system 100 needs to execute a particular portion of the script code, that particular portion may not be compiled. Therefore, no executable code corresponding to a particular portion of script may exist in the online system 100 if no request from a client device needs to execute that portion of script. For example, a script may include an "if-then-else" statement that executes an "if" portion of script if a condition evaluates to true and an "else" portion of script if the condition evaluates to false. If all incoming requests evaluate the condition to a true value, these request only execute the "if" part of the script. Accordingly, executable code corresponding to the "else" part of the "if-then else" statement may never be generated, unless an incoming request results in the condition being evaluated to a false value.

Figure 2:
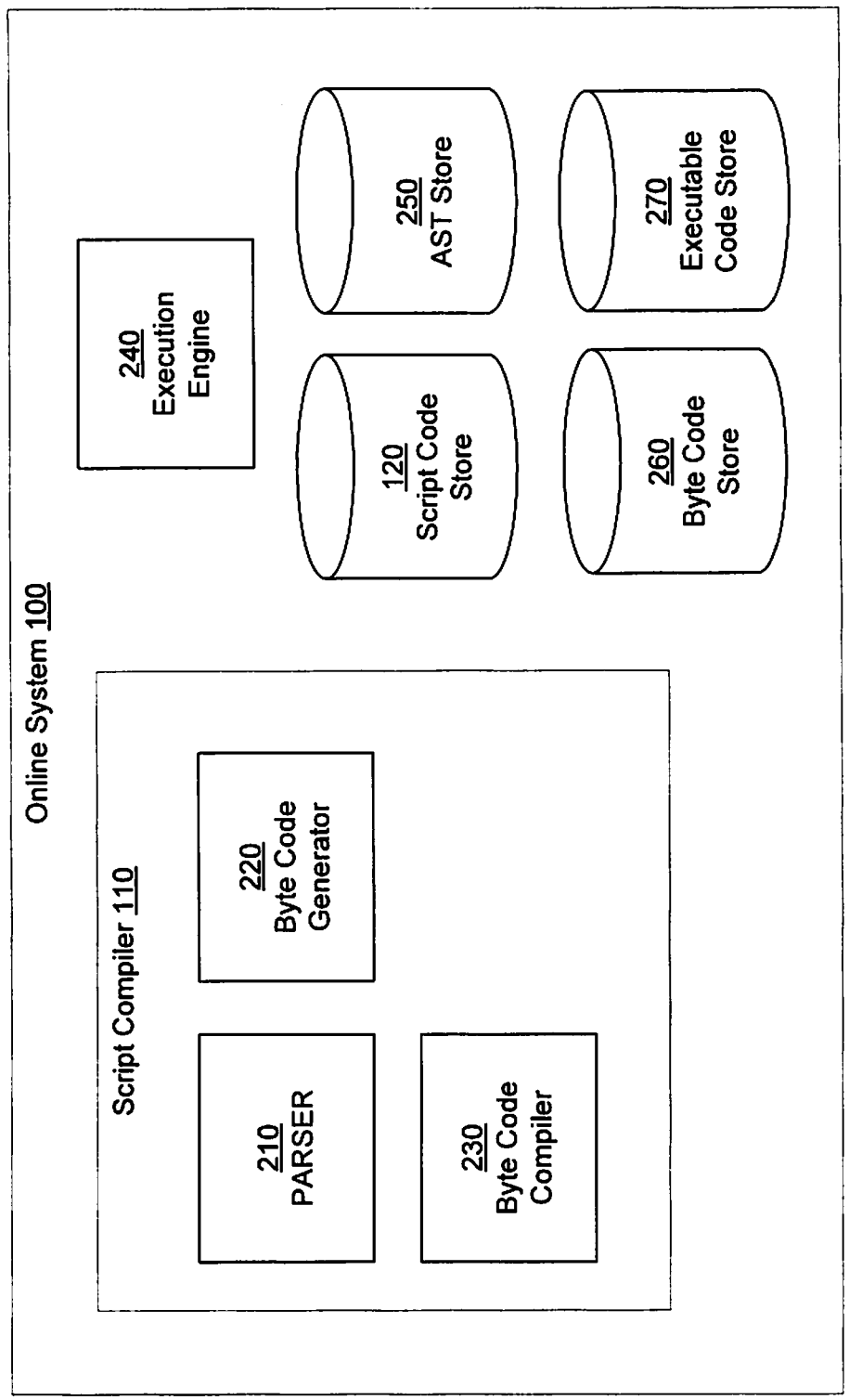
FIG. 2 is a block diagram illustrating an architecture of an online system that generates dynamic web pages by incrementally compiling script code at runtime.

FIG. 2 illustrates an architecture of an online system 100 that generates dynamic web pages by incrementally compiling script code at runtime, in accordance with an embodiment of the disclosed technique. The online system includes the script code store 120, an abstract syntax tree (AST) store 250, a byte code store 260, an executable code store 270, an execution engine 240, and the script compiler 110. The script compiler 110 further includes a parser 210, a byte code generator 220, and a byte code compiler 230. Some embodiments of the online system 100 have different and/or other modules than the ones described herein, and the functions can be distributed among the modules in a different manner than is described here. For example, several modules shown in the online system 100 may be present in a client device 160 if the script code being processed is client side script code.

The script code store 120 stores script code, for example, script code specified as PHP, server side JAVASCRIPT, or another syntax. The script code may be input by a software developer using an editor or copied from another computer. In an embodiment, the script code is specified in a human readable text form. The parser 210 reads the script code from one or more files in the script code store 120 and builds a data structure called an AST that is stored in the AST store 250. The AST is a hierarchical tree representation of script code. The parser 125 checks the script code for syntax errors and reports the errors to allow a user to correct the errors.

The byte code generator 220 traverses the AST representation of the script code and generates byte code corresponding to the script code. The byte code is stored in the byte code store 260. The byte code includes code represented using an instruction set that is designed for efficient execution by an interpreter or for efficient compilation into executable code, for example, machine code. The byte code instructions may correspond to a virtual stack machine or a virtual register machine. The byte code compiler 230 converts byte code into executable code and stores the generated executable code in the executable code store 270.

The execution engine 240 executes the instructions available in the executable store 270. For example, the execution engine 240 may be invoked in response to a request received from a client device 160. The execution engine 240 identifies executable code corresponding to the request received for execution. An online system 100 may compile all available byte code stored in the byte code store 260, for example, as a batch process and store the generated executable code in the executable code store 270. Compiling all available byte code store in advance ensures that executable code is readily available for any request that is received by the online system, so long as the corresponding script code is available in the script code store 120. However, script code typically supports features that make it difficult to generate efficient executable code. For example, script code may support untyped variable for which the type is not available until runtime. Programmers often use untyped variables since they do not require the programmer to make early decisions regarding types of variables used. A programmer may specify a variable as untyped even if at runtime the variable only stores values of one particular type, for example, an integer value. In practice significant amount of script code is executed based on a limited set of types corresponding to the untyped variables. However, if the online system 100 compiles the byte code to executable code prior to receiving the requests at runtime, the type information may not be available for the variables. A byte code compiler 230 that compiles the byte code without making any specific assumptions about the types of the variables may generate inefficient executable code since the generated executable code accounts for all possible types that each untyped variable may take, whether or not the incoming requests use these types.

Embodiments of the byte code compiler 230 compile byte code to executable code based on information available at runtime. For example, the byte code compiler 230 may utilize type information of variables obtained during an execution of the script code to generate executable code optimized for these specific types. Accordingly, executable code required for executing a request may or may not be available in the executable code store 270 at runtime. If executable code corresponding to the request is not available in the executable code store 270, the execution engine 240 identifies byte code corresponding to the request from the byte code store 230. The execution engine 240 invokes the byte code compiler 230 to compile the byte code corresponding to the request to generate executable code. The execution engine 240 provides type information of variables obtained during the current execution of the script code to the byte code compiler 230. Accordingly, the byte code compiler 230 generates efficient executable code based on the type information of variables available. The execution engine 240 executes the generated executable code. In some embodiments, executable code may be generated directly from script code without requiring byte code generation.

If future executions of the script code provide variables of the same type as the first request, the executable code can be reused for the future requests. However, if a subsequent execution provides a different combination of types of variables compared to the first execution, the execution engine 240 invokes the byte code compiler 230 to generate executable code corresponding to the new combination of types corresponding to the variables. Accordingly, the executable code store 270 may store different executable codes for the same byte code program, each executable code corresponding to a different combination of variable types. The byte code compiler 230 may never generate executable code corresponding to type combinations that are never received in executions of the script code.

In an embodiment, the byte code compiler 230 compiles a basic block of byte code at a time. A basic block of code has one entry point, i.e., no instruction within the basic block other than the entry point can be reached from anywhere in the script code as a destination of a jump instruction. The entry point is typically the first instruction of the basic block. A basic block may have one or more exit point, i.e., typically the last instruction of the basic block causes the program control to start executing another basic block. The last instruction may evaluate certain condition and determine the next basic block for execution based on the result of the evaluation of the condition. For example, the last instruction may evaluate a binary condition and transfer program control to one basic block if the condition evaluates to true otherwise transfer program control to another basic block (if condition evaluates to false). Similarly, the last instruction of the basic block may transfer control to different basic blocks based on the value of a particular variable. For example, if the variable value is 1, program control is transferred to basic block B1, if the variable value is 2, program control is transferred to basic block B2, if the variable value is 3, program control is transferred to basic block B3, and so on. The simple structure of a basic block makes it easy for the byte code compiler 230 to optimize and compile a basic block.

The executable code of the script includes executable blocks (also referred as "executable basic blocks") of the script and/or executable control regions of the script. An executable block corresponds to a basic block of the script (which is described in further detail with reference to FIGS. 4 and 5), whereas an executable control region of the script includes instructions for executing a set of basic blocks. An executable control generator 235 generates an executable control region for a set of basic blocks based on various criteria (which is described in further detail with reference to FIGS. 6-10).

Figure 3:
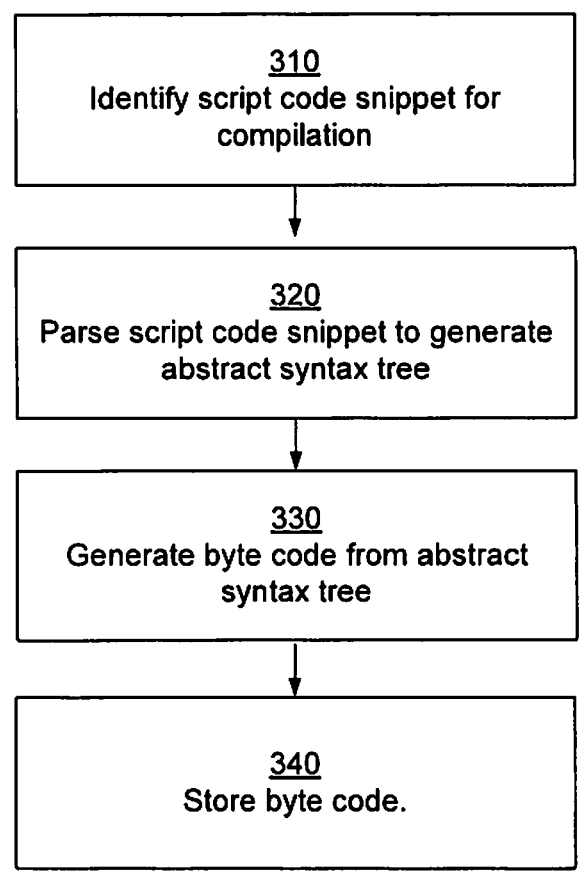
FIG. 3 is a flow diagram illustrating the process of compiling script code.

FIG. 3 is a flow diagram illustrating the process of compiling script code, in accordance with one embodiment of the disclosed technique. The process illustrated in FIG. 3 may be executed by the script compiler 110 as a batch process that compiles script code stored in the script code store 120. For example, software developers may periodically provide new scripts implementing certain features of the online system 100. The received script code may be compiled as a batch process by the online system 100. Alternatively, software developers may update existing script code, thereby requiring recompilation of the updated script code. The script compiler 110 may repeat the steps shown in FIG. 3 for all the script code that need to be recompiled.

The script compiler 110 identifies 310 a script for compilation. The script compiler 110 invokes the parser 210 for parsing the script. The parser 210 parses 320 the script code to generate an AST representation of the script code. The parser 210 stores the AST representation in the AST store 250. In an embodiment, modules of the script compiler 110 perform various operations using the AST representation, for example, static analysis, type inference, and optimizations. As a result, the script compiler 110 may annotate the AST and/or transform the AST. The script compiler 110 stores the annotated ASTs or the transformed ASTs in the AST store 250. Each step performed by the script compiler 110 typically use the latest version of the AST from the AST store 250 and generates a subsequent version of the AST. The byte code compiler 230 generates 330 byte code from the AST representation of the script code and stores 340 the generated byte code in the byte code store 260.

The byte code compiler 230 incrementally compiles the byte code stored in the byte code store at runtime to generate corresponding executable code. The byte code compiler 230 performs the incremental compilation responsive to executions of the script code, for example, executions caused by requests received from client devices 160.

In at least some embodiments, the execution engine 240 requests compilation of one basic block of byte code at a time. More specifically, the execution engine 240 requests compilation of one basic block for a particular combination of types of the variables as required for execution of an incoming request. In at least some other embodiments, the execution engine 240 may request compilation of a group of basic blocks to generate more optimal executable code. Additionally or alternatively, the execution engine 240 may request the compilation of one basic block during a first phase of execution of the script, and request compilation of group of basic blocks during a second phase of execution.

Figure 4:
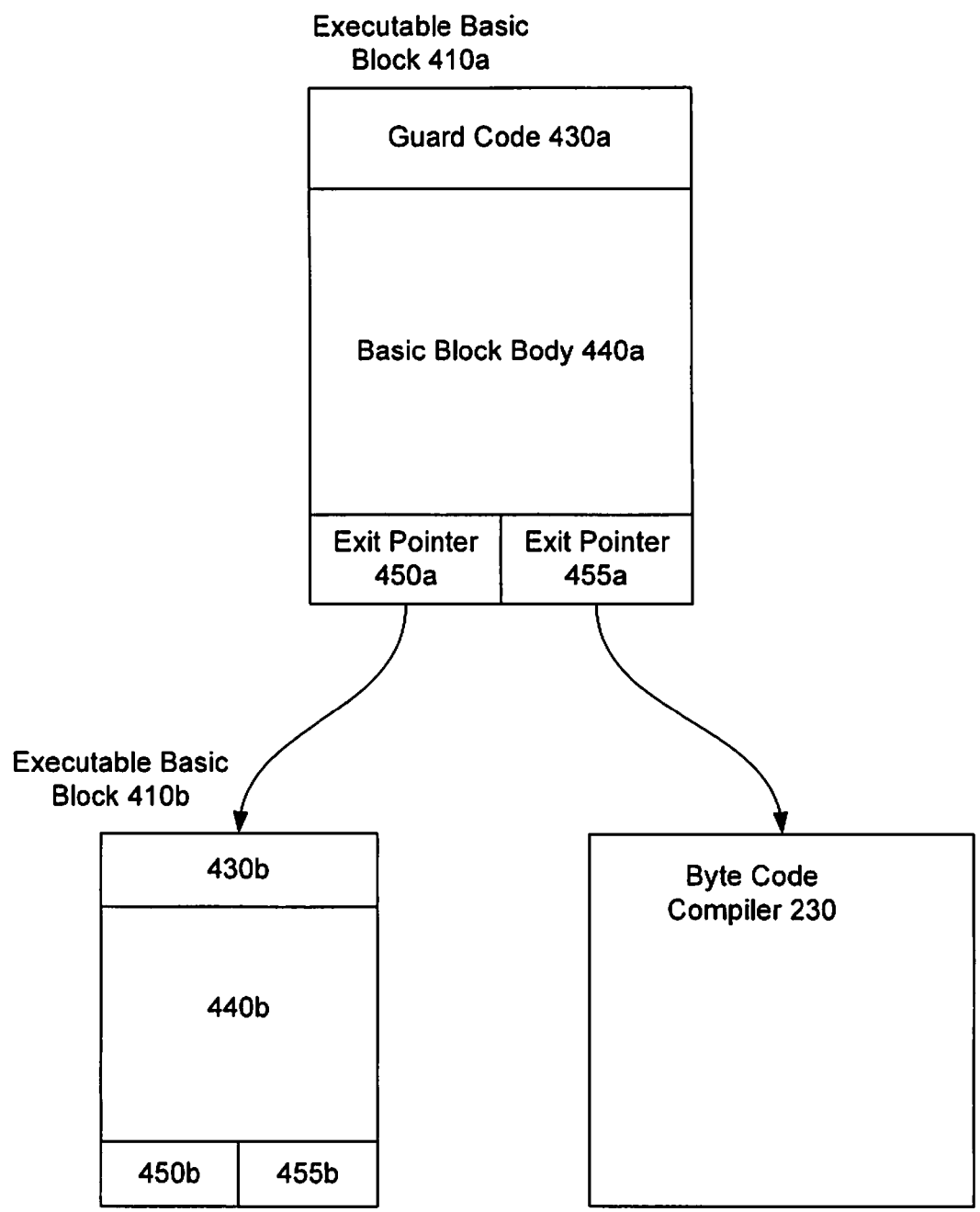
FIG. 4 illustrates the structure of executable code generated by a script compiler.

FIG. 4 is a diagram illustrating the structure of executable code generated by a script compiler, in accordance with one embodiment of the disclosed technique. The generated executable basic block 410 includes a portion of guard code 430, a basic block body 440, and one or more exit pointers 450. The executable basic block 410 is generated in response to receiving a request from the client device 160. Accordingly, the executable basic block 410 is optimized for the types of variables as provided by the incoming request.

The following example illustrates how executable code is generated for a given basic block. Assume that a basic block includes two untyped variables varA and varB. Further assume that for a particular execution it is determined that both variables varA and varB are integers. Accordingly, the byte code compiler 230 compiles the basic block to generate the basic block body 440 assuming the variables varA and varB are integers. The guard code 430 includes instructions that check a particular condition before executing the basic block body 440. In the above example, the generated guard code 430 verifies that the types of variables varA and varB are integers. If the types of both variables are integers, the guard code 430 continues execution of the basic block body 440.

The last instruction of an executable basic block 410a that is executed typically causes the program control to begin execution of another executable basic block 410b. Accordingly, the last instruction of the executable basic block 410 may include an exit pointer 450 that specifies the address of an executable basic block 410*b* for execution after the execution of the executable basic block 410. The last instruction of an executable basic block 410*a* that is executed may transfer control to different executable basic blocks 410 depending on certain criteria. For example, the last instruction in a basic block may correspond to an "if" condition that executes one basic block if the condition is evaluated to true and another basic block if the condition is evaluated to false. Therefore, the last instruction of the executable basic block 410 may include one or more exit pointers 450*a*, 455*a*, and so on.

The exit pointer 450*a* points to another executable basic block 410*b*. If a particular executable block that needs to be executed subsequent to the execution of the executable basic block 410*a* has not been compiled so as to generate a corresponding executable basic block, the corresponding exit pointer 455*a* transfers control to the byte code compiler 230. The byte code compiler 420 may be provided with information describing the subsequent basic block that needs to be compiled: The address of the subsequent basic block may be communicated to the byte code compiler 230 using function-calling conventions of the native machine in which the system is hosted. In this embodiment, the byte code compiler 230 obtains the address of the byte code corresponding to the subsequent basic block to be compiled from the top of the stack. Once the byte code compiler 230 generates an executable basic block 410 corresponding to the subsequent basic block, the pointer 455*a* is changed to point to the generated executable basic block instead of the byte code compiler 230.

In at least some embodiments, the byte code compiler 230 generates different executable basic blocks for different combinations of type of the variables of a basic block. That is, the byte code compiler 230 generates one executable basic block for variable types integer, another executable basic block where both the variables are float, another executable basic block where one variable is integer and another is float and so on.

Further, in at least some other embodiments, the executable basic blocks may be generated based on criterion other than type of variables in the basic block. The guard code would have instructions accordingly to verify the criteria based on which the executable block is created before the basic block body of the executable block is executed.

Figure 5:
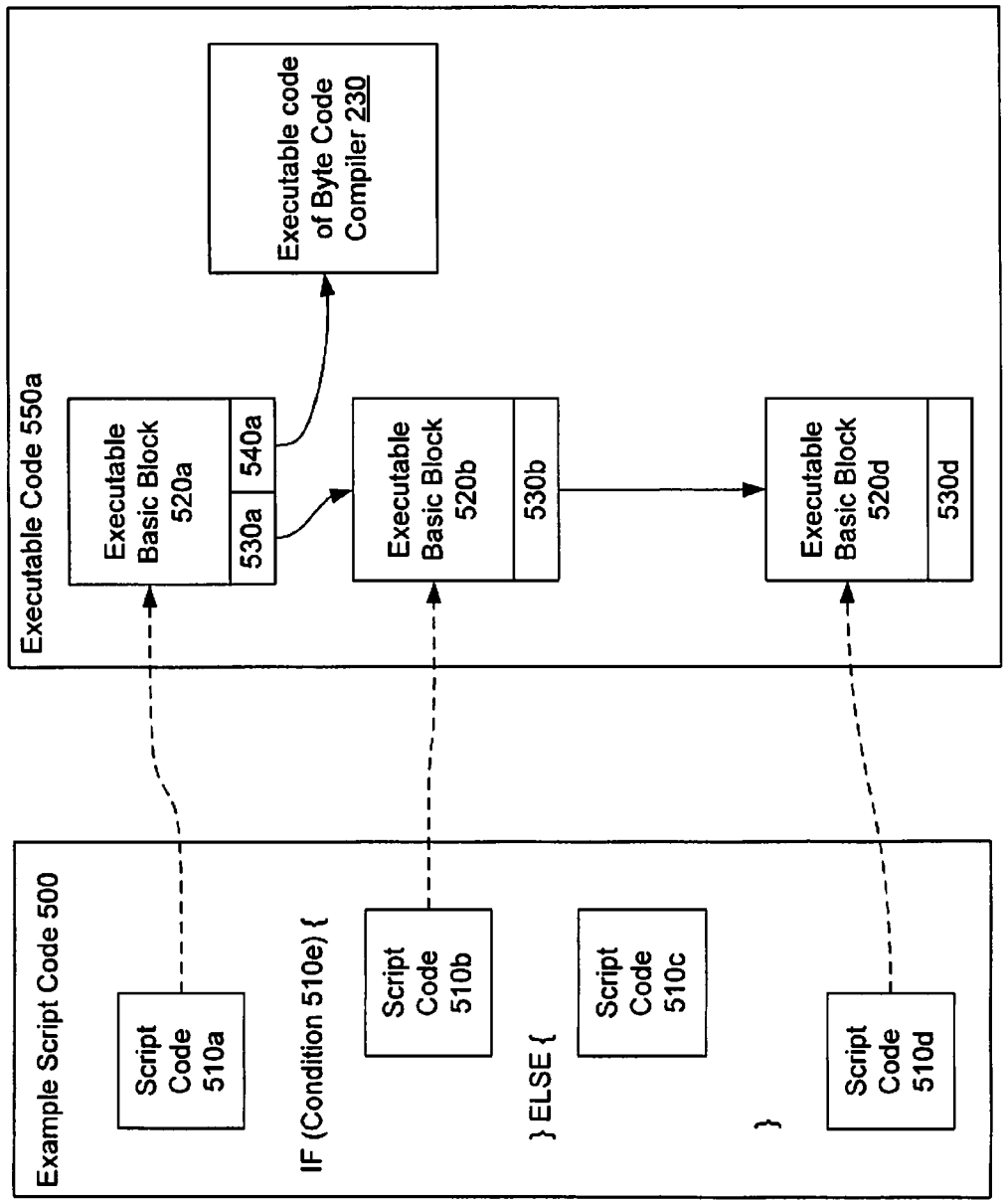
FIG. 5 is a block diagram illustrating incremental compilation of byte code obtained from an example script code.

FIG. 5 illustrates incremental compilation of byte code obtained from an example script code, in accordance with one embodiment of the disclosed technique. FIG. 5 shows an example script code 500 executed in response to a request from client device 160. The example script code 500 includes a portion of byte code 510*a* followed by an if-then-else statement, followed by another portion of byte code 510*d*. The if-then-else statement includes a condition 510*e*, a portion of byte code 510*b* that is executed if condition 510*e* evaluates to true, and a portion of byte code 510*c* that is executed if the condition 510*e* evaluates to false.

Assume that a request is received from a client 160 that includes values of variables that result in the condition 410*e* evaluating to true. The resulting executable code generated by the byte code compiler 230 includes the executable code 550*a* shown in FIG. 5. The portion of script code 510*a* combined with the condition 510*e* corresponds to executable code 520*a*. The executable code 520 includes a guard code 430 in the beginning to verify whether the types of the variables correspond to a specific combination. The end of the executable code 520*a* includes instructions evaluating the condition 510*e*. If the condition 410*e* evaluates to true, the program control is transferred according to exit pointer 530*a* otherwise the program control is transferred according to exit pointer 540*a*.

Since the current request received from the client 160 results in the condition 410*e* evaluating to true, the executable basic block 520*b* corresponding to portion of script code 510*b* is also generated. The script code 500 shows that after execution of script code 510*b*, the script code 510*d* is executed. Accordingly, the executable basic block 520*d* corresponding to the script code 510*d* is also generated. For the execution of the current request, the script code 510*c* is never executed since it corresponds to the "else" portion of the if-the-else statement that is not executed when the condition 510*e* evaluates to true. Accordingly, the end of executable basic block 520*a* includes an exit pointer 540*a* pointing to the byte code compiler 230 with information identifying byte code corresponding to script code 510*c*.

If several subsequent requests all include variables with types matching those corresponding to the previous request and result in condition 510*e* evaluating to true, the executable code 550*a* can be executed to process these requests. A new set of executable code may be generated if a request is received that requires execution of script code 500 with a new combination of types of variables, different from those corresponding to executable code 550*a*. However, if all requests received from the client device 160 continue providing the same combination of variable types and always result in the condition 510*e* evaluating to true, the executable code 550*a* continues to process the requests and no new executable code needs to be generated.

If at any stage, an execution of the script code is performed that provides the previous combination of variable types that cause the condition 510*e* to evaluate to false, the exit pointer 540*a* causes the byte code compiler 230 to be invoked causing an executable basic block to be generated corresponding to the script code 510*c*. The script compiler 110 changes the exit pointer 540*a* to point to the generated executable basic block instead of the byte code compiler 230. Since the execution of the script code 510*c* is followed by the execution of the script code 510*d*, the exit pointer at the end of the executable basic block is configured to point to the executable block 520*d* corresponding to script code 510*d*. The executable code 550*a* which now includes executable block for script code 510*c* can process requests that result in the condition 510*e* evaluating to true as well as false without having to invoke the byte code compiler 230. Furthermore, the executable basic block for script code 510*c* is not generated unless an execution that causes the condition 510*e* to evaluate to false is received. Accordingly, the script compiler 110 generates executable code in a lazy fashion, the generation performed only if a request requires certain portion of script code to be executed. As a result, the script compiler 110 does not generate dead code, i.e., code that is never executed.

FIGS. 6-10 describe methods and systems for managing shared resources in a cache in a multi-threaded environment.

Figure 6:
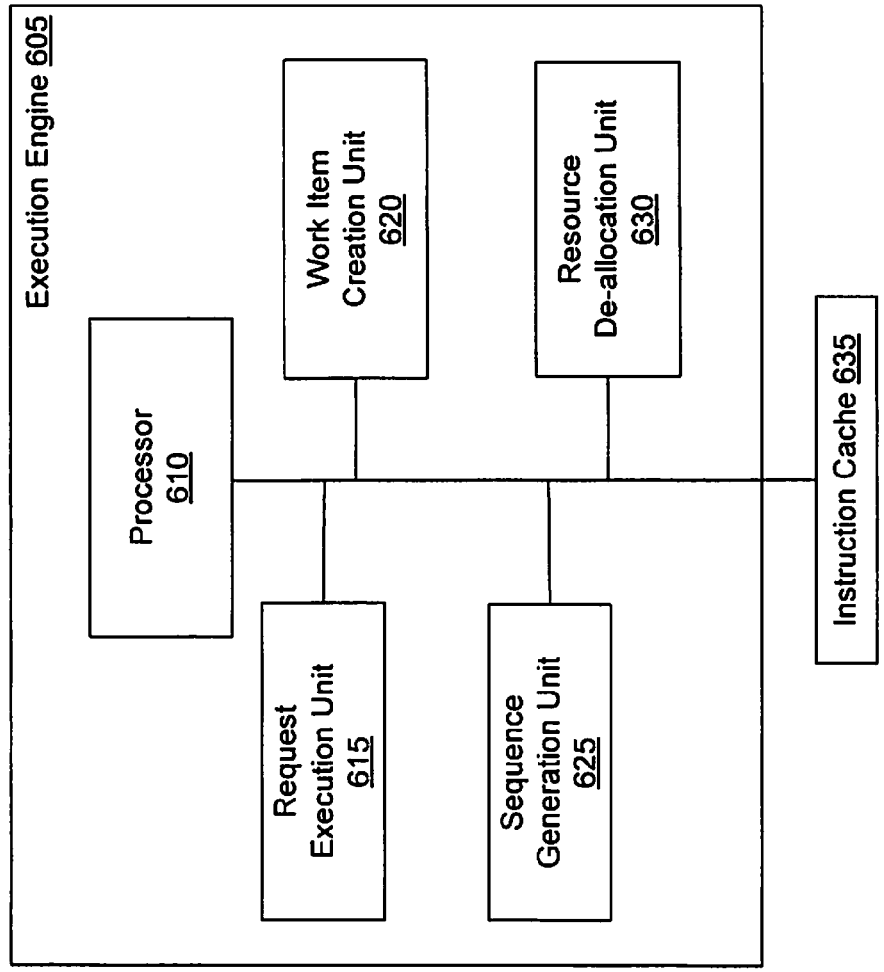
FIG. 6 illustrates a block diagram of a system for managing a cache in a multi-threaded environment.

FIG. 6 illustrates a block diagram of a system 600 for managing shared resources in a cache of a multi-threaded system, according to an embodiment of the disclosed technique. Although the diagrams depict components as functionally separate, such depiction is merely for illustrative purposes. It will be apparent to those skilled in the art that the components portrayed in this figure can be arbitrarily combined or divided into separate components. In an embodiment, the system 600 can be part of online system 100. The system 600 includes an execution engine 605 that executes a script code. The execution engine 605 can be similar to the execution engine 240 and the script code can be similar to the script code 500. The script code is executed by executing executable code generated for the script code, such as executable code 550*a*.

In an embodiment, when the script code or at least a portion of the script code is modified, a new version of the executable code is generated and loaded into the instruction cache 635 for execution. However, the older version of the executable code and/or metadata associated with the older version of the executable code cannot be deleted until all the requests that were executing before the newer version of the executable code is loaded into the instruction cache 635 have completed executing. The requests that had begun executing before the newer version of the executable code was loaded may still be accessing the older version of the executable code. Accordingly, the system 600 determines a point in time when the requests that were executing before the newer version of the executable code is loaded into the instruction cache 635 have completed executing, and deletes the older version of the executable code accordingly.

The system 600 includes a request execution unit 615 that receives requests for executing the script code, a work item creation unit 620 that creates a work item for deleting a shared resource from the instruction cache 635, a sequence generation unit 625 that assigns a sequence number to each of the requests and/or the work items created in the system 600, and a resource de-allocation unit 630 that deletes the shared resource, identified by a particular work item, from the instruction cache 635. The resource de-allocation unit 630 deletes the shared resource only if there are no requests with sequence numbers lesser than that of the particular work item executing in the system 600. In an embodiment, the shared resource can include at least one of executable code or data associated with the executable code, such as metadata. Examples of metadata can include data associated with a method, class, etc. of the script code.

The request execution unit 615 receives requests for executing the script code from a plurality of threads executing in the system 600. The processor 610 reads the executable code corresponding to the request from an instruction cache 635, and executes it. In an embodiment, the executable code may be loaded into the instruction cache 635 from an executable code store 270 of FIG. 2 prior to its execution. Each of the threads can create one or more requests.

When the execution engine 605 starts executing the requests, the sequence generation unit 625 assigns a sequence number to each of the requests, which indicates the order in which the requests started executing. In an embodiment, the sequence number is a global sequence number, that is, a sequence number which tracks the order of the requests across multiple threads. For example, if request execution unit 615 receives requests RA, RB from thread t1, request RC from thread t2, and request RD from thread t3, in the order RC, RA, RD, and RB, then the sequence generation unit 625 generates sequence numbers from 1 to 4 and assign them to corresponding requests as follows: RC1, RA2, RD3, and RB4.

A request can produce work items as a side effect of execution of the request. Work items are objects that perform particular tasks, such as deleting a particular shared resource. For example, when the executable code in the instruction cache 635 becomes obsolete, one or more work items can be created by the work item creation unit 620 to delete the older version of the executable code in the instruction cache 635. However, the request that created the work item cannot execute the work item since there may be requests belonging to other threads that are active and still accessing the identified shared resource.

The sequence generation unit 625 assigns a sequence number to the work item upon creation. As described above, the sequence number is assigned to requests and/or work items to indicate the order in which they are created. The sequence number assigned to the work item will be a number next in sequence to the sequence number of the most recently created request or the work item. For example, consider that thread t1 issues requests RA and RB, thread t2 issues request RC, and request RB creates work items WX and WY. Also consider that the requests and the work items are created in the order RA, WX, RB, RC and WY. The sequence generation unit 625 can generate sequence numbers, for example, from 1 to 5 as and when the request or work item was created, and assign them to each of the requests and/or work items as follows: 1RA, 2WX, 3RB, 4RC and 5WY.

After the work item is created and assigned a sequence number, the work item creation unit 620 adds the work item to a queue. The work items would remain in the queue until they are executed to perform the tasks they are configured to. After the work items are executed, they may be removed from the work item queue. The resource de-allocation unit 630 examines the work item queue to determine whether any of the work items can be executed to delete the shared resource and claim the memory used by the shared resource.

When a new request arrives at the request execution unit 615 and starts executing, the new request determines, for each of the work items in the queue, whether there are any requests executing in the system 600 which have a sequence number lesser than that of a particular work item in the queue. If there is at least one request with a sequence number lesser than that of the particular work item executing in the system 600, the particular work item is ignored by the new request. That is, the particular work item is not executed since there is at least one active request executing in the system 600 that had started executing before the new version of the executable code was loaded into the instruction cache 635.

On the other hand, if there are no requests with a sequence number lesser than that of the particular work item executing in the system 600, the particular work item is executed to delete the shared resource, identified by the particular work item, from the instruction cache 635. After the particular work item is executed, it is removed from the work item queue.

As described above, the resource de-allocation unit 630 may examine the work item queue when a new request starts executing. Alternatively or additionally, the resource de-allocation unit 630 may examine the work item queue when a request completes execution. In at least some other embodiments, the resource de-allocation unit 630 may be configured to examine the work item queue at predefined intervals; on predefined time of the day/day of the week/month, etc.; or based on a trigger such as when the amount of space consumed in the instruction cache 635 exceeds a predefined threshold, etc.

Further, the sequence number assigned to each of the requests and/or work items provides a way to determine or identify requests that were created (and still executing) before a particular work item was created. One way of generating a sequence number is to, as described above, generate a sequence s=1 to n, where n is an integer. The sequence number s can be incremented by one unit whenever a new request and/or work item is created. The sequence number may also be incremented by a predefined amount, for example, 10 instead of 1.

However, in other embodiments, the sequence number can be generated in many other ways that can help in identifying requests that were created (and still executing) before a particular work item was created. In one embodiment, the sequence number can be incremented only when a new work item is created, in which case one or more requests can be sharing the sequence number of the previously created work item. For example, consider that the sequence number starts from 1. Assume that requests and work items are created in the order RA, RB, WX, RC, RD, WY. The sequence numbers assigned to each of them is as follows: 1RA, 1RB, 2WX, 2RC, 2RD, and 3WY. In this example, a particular work item, for example 2WX, can be executed only if no requests having sequence number lesser than that of the particular work item are executing in the system 600.

Figure 7:
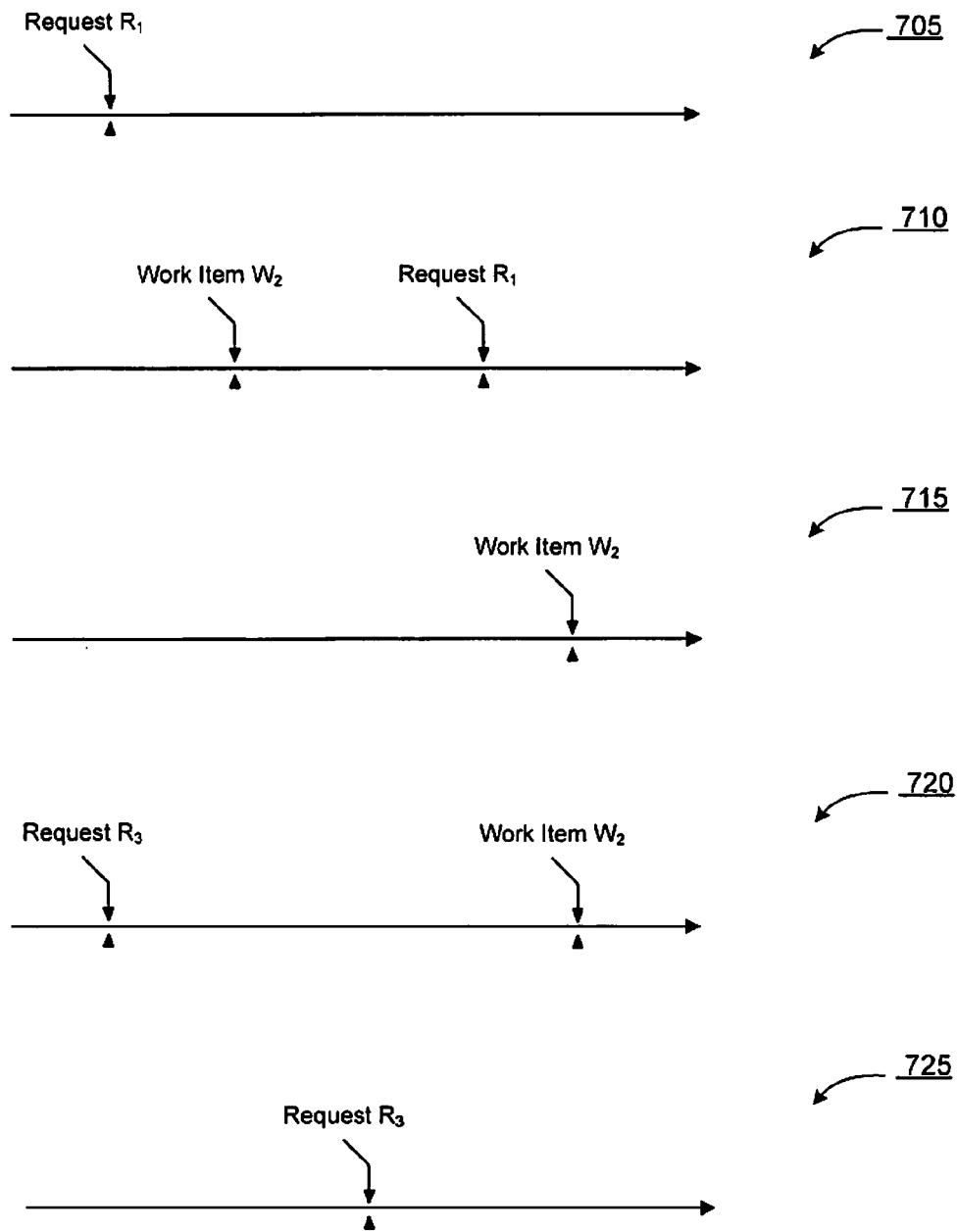
FIG. 7 illustrates an example of deleting a shared resource from the cache in the multi-threaded environment.

FIG. 7 illustrates an example of deleting a shared resource from a cache in the multi-threaded environment, according to an embodiment of the disclosed technique. The example may be executed in the online system 100 of FIGS. 1 and 2, and/or system 600 of FIG. 6. In the example of FIG. 7, $R_s$ indicates a request R for executing script code, $W_s$ indicates a work item for deleting a shared resource, and s indicates a sequence number of the request R and/or work item W, where s=1 to n. Further, the requests may be created by one or more threads executing in the system 600.

At 705, a request $R_1$ starts executing. The request $R_1$ may identify that a part of the instruction cache has become invalid and may create a work item $W_2$ to delete the portion of the instruction cache, as shown at 710. At 715, the request $R_1$ completes executing. At 720, a request $R_3$ starts executing. The request $R_3$ determines whether the work item $W_2$ in the work item queue can be executed. To execute the work item $W_2$, the request $R_3$ determines whether there are any requests that have a sequence number lesser than that of the work item $W_2$, which is 2, executing in the system. Since there are no requests having sequence numbers lesser than 2 executing in the system, the request $R_3$ executes the work item $W_2$. The work item $W_2$ deletes the identified shared resource from the instruction cache 635. After the work item $W_2$ is executed, at 725, the work item is removed from the work item queue and the request $R_3$ continues executing.

Figure 8:
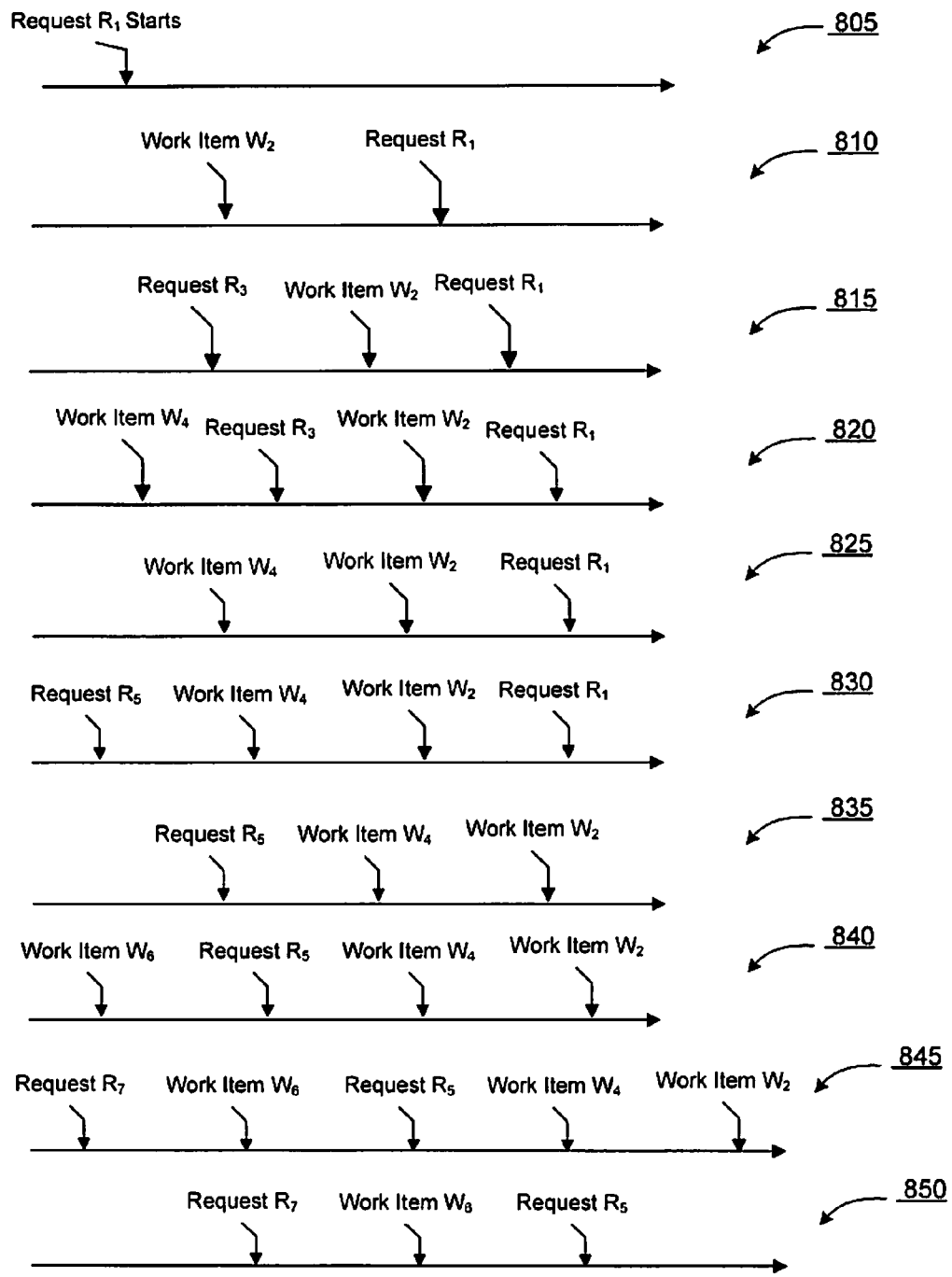
FIG. 8 illustrates another example of deleting a shared resource from the cache in the multi-threaded environment.

FIG. 8 illustrates another example of deleting a shared resource from a cache in the multi-threaded environment, according to an embodiment of the disclosed technique. The example may be executed in the online system 100 as described with reference to FIGS. 1 and 2, and system 600 described with reference to FIG. 6. In the example of FIG. 8, $R_s$ indicates a request R for executing script code, $W_s$ indicates a work item for deleting a shared resource, and s indicates a sequence number of the request R and/or work item W, where s=1 to n. Further, the requests may be created by one or more threads executing in the system 600, and may not complete executing in the order they started executing.

At 805, a request $R_1$ starts executing. At 810, the request $R_1$ creates a work item $W_2$. At 815, a request $R_3$ starts executing. When the request $R_3$ starts executing, it examines the work item queue to determine if work item $W_2$ can be executed. However, since request $R_1$, which has a sequence number, 1, that is lesser than that of work item $W_2$, is still executing, the request $R_3$ ignores the work item $W_2$. Accordingly, the work item $W_2$ still remains in the work item queue.

At 820, the request $R_1$ or $R_3$ creates a work item $W_4$. At 825, the request $R_3$ completes executing. At 830, a request $R_5$ starts executing. When the request $R_5$ starts executing, it examines the work item queue to determine if work items $W_2$ and $W_4$ can be executed. However, since request $R_1$, having a sequence number 1, which is lesser than that of work items $W_2$ or $W_4$, is still executing, the request $R_5$ ignores the work items $W_2$ and $W_4$.

At 835, the request $R_1$ completes executing. At 840, the request $R_5$ creates a work item $W_6$. At 845, a request $R_7$ starts executing. When the request $R_7$ starts executing, it examines the work item queue to determine if work items $W_2$, $W_4$ and/or $W_6$ can be executed. The request $R_7$ determines that the work items $W_2$ and $W_4$ can be executed since there are no requests having a sequence number lesser than that of the work items $W_2$ and $W_4$ are executing in the system. Accordingly, the work items $W_2$ and $W_4$ are executed, the shared resources identified by the work items $W_2$ and $W_4$ are deleted from the instruction cache 635. The work items $W_2$ and $W_4$ are removed from the work item queue, as shown in 850. However, the request $R_7$ ignores the work item $W_6$ since request $R_5$ having a sequence number lesser than that of work item $W_6$, is still executing.

Figure 9:
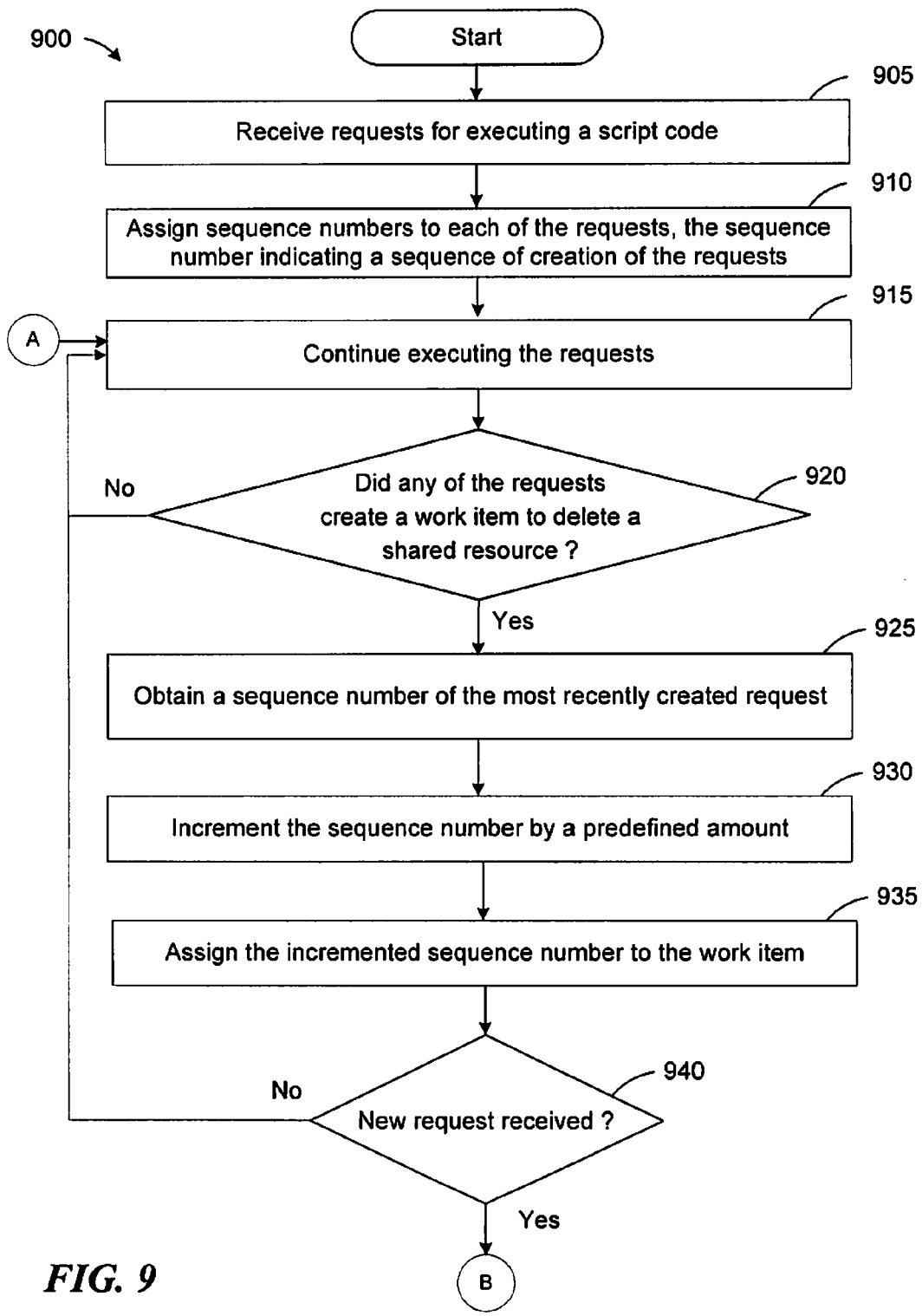
FIG. 9 is a flow diagram illustrating a process of deleting a shared resource from the cache in the multi-threaded environment.
Figure 9:
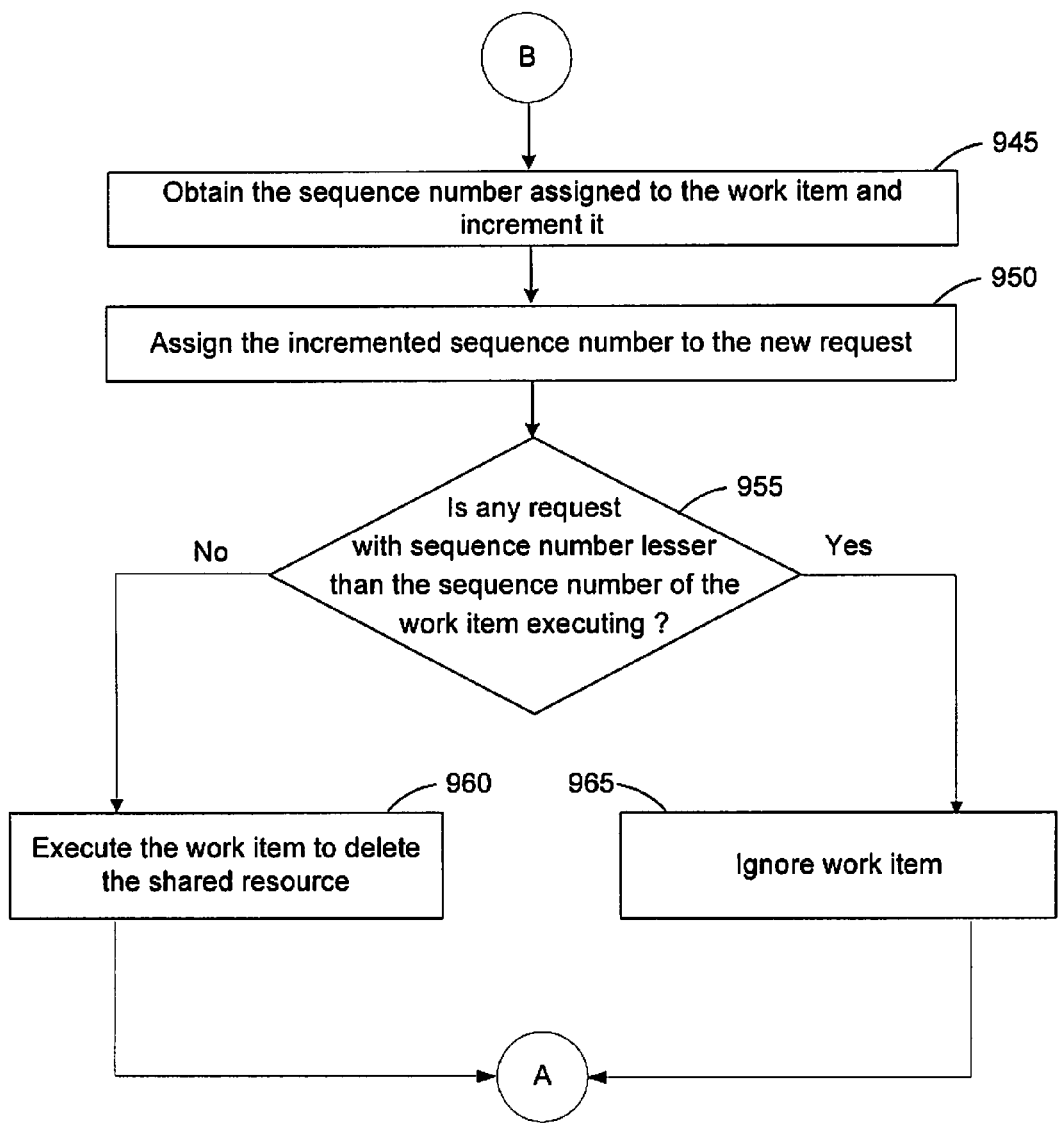

FIG. 9 is a flow diagram illustrating a process of deleting the shared resource from a cache of a multi-threaded system, according to an embodiment of the disclosed technique. The process 900 may be executed in a system such as online system 100 of FIG. 1 or 2 and/or system 600 of FIG. 6. At step 905, the request execution unit 615 receives a plurality of requests to execute a script code. The requests may be received from multiple threads executing in the system. At step 910, the sequence generation unit 625 assigns sequence numbers to each of the requests. The sequence number indicates a sequence in which the requests start executing. At step 915, the execution engine 605 continues executing the requests.

At determination step 920, the work item creation unit 620 determines whether any of requests created a work item. In an embodiment, a work item is an object that performs a particular task when executed, such as deleting a shared resource from the instruction cache 635. Responsive to a determination that a request did not create any work item, the execution engine 605 continues executing the requests. On the other hand, responsive to a determination that the request created a work item, at step 925, the sequence generation unit 625 obtains the sequence number of the most recently created request and/or work item. At step 930, the sequence generation unit 625 increments the sequence number by a predefined amount, and at step 935, assigns the incremented sequence number to the work item. Further, the work item creation unit 620 adds the work item to a work item queue.

At determination step 940, the request execution unit 615 determines whether a new request is received. Responsive to a determination that a new request is not received, the request execution unit 615 continues executing the received requests. On the other hand, responsive to a determination that a new request is received, at step 945, the sequence generation unit 625 obtains the sequence number of the most recently created request and/or work item and increments the sequence number by a predefined amount. At step 950, the sequence generation unit 625 assigns the incremented sequence number to the new request.

At determination step 955, the resource de-allocation unit 630 determines whether there are any requests having a sequence number lesser than that of the work item executing in the system. Responsive to a determination that there are no requests having a sequence number lesser than that of the work item executing in the system, at step 960, the resource de-allocation unit 630 executes the work item to delete the shared resources from the instruction cache 635, and removes the work item from the work item queue. The request execution unit 615 continues executing the requests.

On the other hand, responsive to a determination that there are requests which have a sequence number lesser than that of the work item executing in the system, at step 965, the resource de-allocation unit 630 ignores the work item in the work item queue. Thereafter, the request execution unit 615 continues executing the requests.

Figure 10:
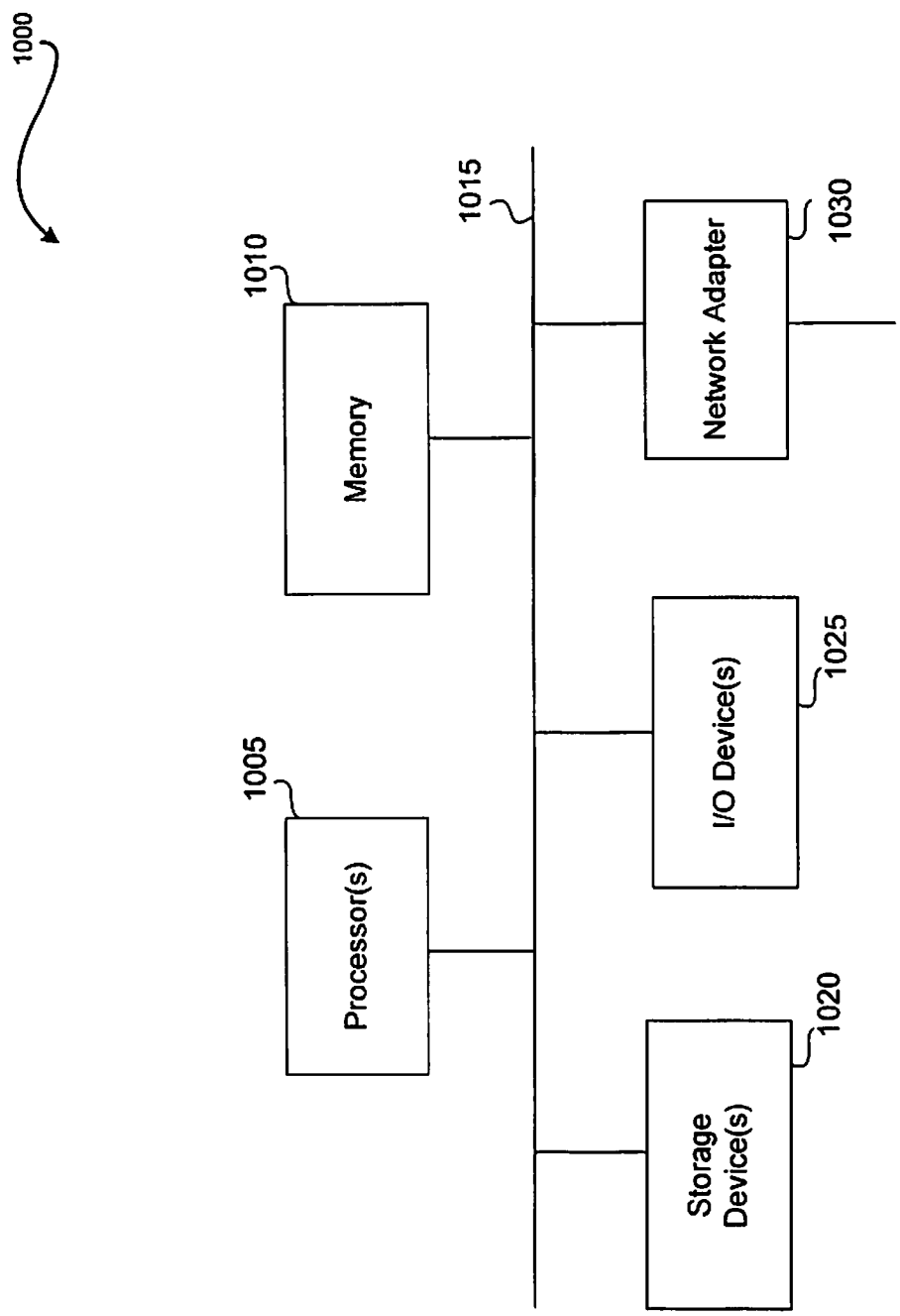
FIG. 10 is a block diagram of a processing system that can implement operations of the present disclosure.

FIG. 10 is a block diagram of an apparatus that may perform various operations, and store various information generated and/or used by such operations, according to an embodiment of the disclosed technique. The apparatus can represent any computer or processing system described herein. The processing system 1000 is a hardware device on which any of the entities, components or services depicted in the examples of FIGS. 1-9 (and any other components described in this specification), such as client device 160, online system 100, execution engine 605, request execution unit 615, work item creation unit 620, etc. can be implemented. The processing system 1000 includes one or more processors 1005 and memory 1010 coupled to an interconnect 1015. The interconnect 1015 is shown in FIG. 10 as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1005 is/are the central processing unit (CPU) of the processing system 1000 and, thus, control the overall operation of the processing system 1000. In certain embodiments, the processor(s) 1005 accomplish this by executing software or firmware stored in memory 1010. The processor(s) 1005 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1010 is or includes the main memory of the processing system 1000. The memory 1010 represents any form of random access memory (RAM), read-only memory (ROM), flash memory, or the like, or a combination of such devices. In use, the memory 1010 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 1005 through the interconnect 1015 are a network adapter 1030, a storage device(s) 1020 and I/O device(s) 1025. The network adapter 1030 provides the processing system 1000 with the ability to communicate with remote devices, over a network and may be, for example, an Ethernet adapter or Fibre Channel adapter. The network adapter 1030 may also provide the processing system 1000 with the ability to communicate with other computers within the cluster. In some embodiments, the processing system 1000 may use more than one network adapter to deal with the communications within and outside of the cluster separately.

The I/O device(s) 1025 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 1010 can be implemented as software and/or firmware to program the processor(s) 1005 to carry out actions described above. In certain embodiments, such software or firmware may be initially provided to the processing system 1000 by downloading it from a remote system through the processing system 1000 (e.g., via network adapter 1030).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 1020 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:
1. A method, comprising:
creating, by a request executing in a computer of a computer system, a work item for removing a shared resource, the request being one of multiple requests, wherein the multiple requests access at least a portion of the shared resource, each of the requests associated with a sequence number indicating a sequence in which the requests are created, the creating including:
  obtaining the sequence number of a most recently created request in the computer system;
  assigning a next sequence number to the work item, the next sequence number being next in the sequence to the sequence number of the most recently created request, wherein the sequence number is assigned an initial value before any of the requests is created, the assigning including:
    assigning the initial value of the sequence number to each of the requests,
    incrementing the sequence number sequentially, upon creation of the work item, to create a new sequence number, and
    assigning the new sequence number to the work item and to a set of new requests that are created after the work item;
determining, by a new request, whether any of the requests having the sequence number lesser than the sequence number of the work item is executing; and
responsive to the determination, by the new request, that there is no request with the sequence number lesser than the sequence number of the work item executing, executing, by the new request, the work item to remove the shared resource.

2. The method of claim 1, wherein the new request is created after the work item is created.

3. The method of claim 1, wherein each of the requests is a request for executing a script code.

4. The method of claim 3, wherein the script code is executed using an executable code generated for the script code.

5. The method of claim 4, wherein the executable code is stored in an instruction cache of the computer system.

6. The method of claim 1, wherein the shared resource includes an executable code of a script code, and is used by the requests for executing the script code.

7. The method of claim 6, wherein creating the work item includes:
creating instructions for deleting at least one of (a) an older version of the executable code or (b) data associated with the older version of the executable code from an instruction cache when a new version of the executable code is loaded into the instruction cache.

8. The method of claim 7 further comprising:
executing, by the new request, the new version of the executable code.

9. The method of claim 1, wherein assigning the sequence number to the each of the requests includes:
incrementing the sequence number sequentially, upon creation of the each of the requests, to create multiple new sequence numbers, and
assigning the new sequence numbers to the corresponding requests.

10. The method of claim 1, wherein incrementing the sequence number includes incrementing the sequence number by a predefined amount.

11. The method of claim 1, wherein the requests are created by a plurality of threads executing in the computer system.

12. The method of claim 11, wherein determining whether any of the requests having the sequence number lesser than the work item are executing includes:
determining whether any of the requests of each of the threads have the sequence number lesser than the work item are executing.

13. A method, comprising:
creating, by a request executing in a computer of a computer system, a work item for deleting an older version of an executable code of a script code, the request being one of multiple requests that are created by a plurality of threads executing in the computer system, wherein the multiple requests access at least a portion of the older version of the executable code, the creating including:
obtaining a sequence number of a most recently created request in the computer system, and
assigning a next sequence number to the work item, the next sequence number being next in sequence to the sequence number of the most recently created request, wherein the sequence number is assigned an initial value before any of the requests is created, the assigning including:
assigning the initial value of the sequence number to each of the requests,
incrementing the sequence number sequentially, upon creation of the work item, to create a new sequence number, and
assigning the new sequence number to the work item and to a set of new requests that are created after the work item;
determining, by a new request created to execute a new version of the executable code, whether any of the requests having the sequence number lesser than the sequence number of the work item is executing; and
responsive to the determination, by the new request, that there is no request with the sequence number lesser than the work item are executing, executing, by the new request, the work item to delete the older version of the executable code.

14. The method of claim 13, wherein the each of the requests is a request for executing the script code.

15. The method of claim 13, wherein the executable code is stored in an instruction cache of the computer system.

16. The method of claim 13, wherein the executable code is generated by:
identifying a basic block from the script code for execution,
determining a set of types corresponding to variables used in the basic block for the execution of the script code, and
generating an executable basic block corresponding to the identified basic block, the executable basic block comprising instructions verifying whether an input set of values provided for executing the executable basic block conform to the set of types.

17. A system, comprising:
a processor;
a request execution unit that works in cooperation with the processor to create and execute multiple requests;
a work item creation unit that works in cooperation with the processor to create a work item for removing a shared resource, wherein the multiple requests access at least a portion of the shared resource;
sequence generation unit that works in cooperation with the processor to
assign a sequence number to each of the requests, the sequence number of a request indicating a position of the request in the sequence of requests, wherein the sequence number is assigned an initial value before any of the requests is created, the sequence number assigned by:
assigning the initial value of the sequence number to each of the requests,
incrementing the sequence number sequentially, upon creation of the work item, to create a new sequence number, and
assigning the new sequence number to the work item and to a set of new requests that are created after the work item,
obtain the sequence number of a most recently created request to create a last sequence number, and
assign a next sequence number to the work item, the next sequence number being next in sequence to the last sequence number; and
a resource de-allocation unit that works in cooperation with the processor to execute the work item to delete the shared resource if there is no request with the sequence number lesser than the sequence number of the work item is executing.

18. The system of claim 17 further comprising:
an instruction cache to store instructions for executing the request.

* * * * *